United States Patent [19]
Kosumi et al.

[11] Patent Number: 5,593,015
[45] Date of Patent: Jan. 14, 1997

[54] PULL-TYPE CLUTCH PRESSURE PLATE ACTUATING MECHANISM PROVIDING REDUCED-FORCE DISENGAGEMENT

[75] Inventors: Toshiya Kosumi, Osaka; Masaaki Asada, Ibaraki, both of Japan

[73] Assignee: Exedy Corporation, Osaka, Japan

[21] Appl. No.: 516,717

[22] Filed: Aug. 18, 1995

[30] Foreign Application Priority Data

Aug. 24, 1994 [JP] Japan .................................. 6-199436

[51] Int. Cl.⁶ ............................. F16D 13/48; F16D 23/14
[52] U.S. Cl. ................. 192/70.27; 192/70.3; 192/89.24; 192/99 A
[58] Field of Search ............................ 192/70.27, 70.11, 192/70.3, 89.24, 99 A

[56] References Cited

U.S. PATENT DOCUMENTS

| | | | |
|---|---|---|---|
| 4,856,634 | 8/1989 | Kitano et al. | 192/70.3 |
| 4,890,708 | 1/1990 | Kitano et al. | 192/70.3 |
| 5,377,803 | 1/1995 | Link et al. | 192/89.24 X |

*Primary Examiner*—Andrea L. Pitts
*Attorney, Agent, or Firm*—Shinjyu Office of Patent Attorneys

[57] ABSTRACT

A clutch cover assembly 5 includes a clutch cover 14, a main pressure plate 15, a retaining collar 20, a diaphragm spring 21, a cone spring 16, and an intermediary lever 26. The diaphragm spring 21 presses the retaining collar 20 toward the flywheel 2. The cone spring 16 is placed between the main pressure plate 15 and the retaining collar 20 so as to be compressed axially. The intermediary lever 26 multiplies the impelling force of the diaphragm spring 21 on the retaining collar 20 in transmitting the force to the main pressure plate 15, according to a predetermined lever ratio.

9 Claims, 4 Drawing Sheets

PULL-TYPE CLUTCH PRESSURE PLATE ACTUATING MECHANISM PROVIDING REDUCED-FORCE DISENGAGEMENT

BACKGROUND OF THE INVENTION

1. Field of the Invention

The present invention relates to a pull-type clutch pressure plate actuating mechanism, and more particularly, it relates to a pressure plate actuating mechanism wherein a plurality of intermediary levers are utilized between the clutch pressure plate and diaphragm spring to gain mechanical advantage in disengaging the clutch.

2. Description of the Related Art

A pressure plate actuating assembly in an automobile clutch generally includes a bowl-shaped clutch cover fixed to the flywheel of an engine, a pressure plate disposed within the clutch cover, and a diaphragm spring for impelling the pressure plate toward the flywheel. In one example of a pull-type a clutch, a pressure plate actuating assembly includes a retaining collar holding the diaphragm spring and coupled to a release mechanism. The retaining collar in this construction is impelled toward the flywheel by the diaphragm spring. Furthermore, a lever element is provided supported by the retaining collar in between the diaphragm spring and the pressure plate.

In the pressure plate actuating assembly having the retaining collar and the lever element, impelling force from the diaphragm spring is transmitted to the pressure plate via the intervening lever element while the clutch is engaged. Therein, the impelling force on the pressure plate is multiplied according to a lever ratio of the lever element. Consequently, pressing force greater than the impelling force of the diaphragm spring is applied to the pressure plate.

Accordingly, an actuating assembly employing a diaphragm spring having a low spring rate in conjunction with the lever element nonetheless can transmit sufficient magnitude of pressing force to the pressure plate, due to the mechanical advantage gained by the lever element. A diaphragm spring having a lower spring rate reduces force of resistance to disengagement of the pressure plate during a clutch release operation. In particular, a reduced load to be overcome in releasing the clutch reduces the leg power needed to work the clutch operating pedal in a vehicular installation.

In pressure plate actuating assemblies as above, however, spacial limitations have restricted the lever ratio of the lever element. Consequently, while it would be advantageous to reduce the clutch-releasing load of the pressure plate actuating assembly still further, the mechanical advantage that can be gained by means of the lever element alone in the conventional pressure plate actuating assembly is insufficient for this purpose.

SUMMARY OF THE INVENTION

Accordingly, it is an object of the present invention to reduce the force of resistance to disengagement of the pressure plate during a clutch release operation, thereby reducing the leg power needed to work the clutch operating pedal.

In accordance with one embodiment of the present invention, a clutch cover assembly in a pull-type clutch mechanism includes a clutch cover fixed to a flywheel for rotation therewith. At least one pressure plate is disposed between the clutch cover and the flywheel. A release mechanism having a retaining collar is disposed at least partially within the clutch cover. A first spring is supported on the clutch cover biasing the retaining collar toward the pressure plate and the flywheel. A second spring is disposed between the pressure plate and the retaining collar. A plurality of lever mechanisms disposed between the retaining collar and the clutch cover are configured for movement in response to movement of the retaining collar to engage the pressure plate. The second spring is configured for compression in response to movement of the plurality of lever mechanisms such that biasing of the second spring opposes biasing of the first spring, the lever mechanisms providing mechanical advantage in engagement and disengagement of the clutch assembly in accordance with a predetermined lever ratio.

Preferably, the lever mechanisms include a lever element having a first end in contact with an radial end surface of the retaining collar, a second end supported by the clutch cover, and an intermediate portion extending toward the pressure plate.

In one embodiment, the second spring is disposed on a surface of the pressure plate opposite a friction surface of the pressure plate.

In an alternate embodiment the second spring is disposed between a portion of the retaining collar and the lever elements.

Preferably, the second spring is a conical spring.

Further, in another aspect of the present invention, the clutch cover assembly may include a clutch cover configured for mounting on a flywheel, the clutch cover having a diaphragm spring. A pressure plate assembly is peripherally supported within the clutch cover. A retaining collar is disposed concentrically within the clutch cover between the pressure plate and the diaphragm spring and has a radially inward lip supporting a radially inward rim of the diaphragm spring. Further, a plurality of intermediary levers are disposed between the pressure plate and the retaining collar, each lever having:

a radially inward lever end circumferentially retained by a flange portion of the retaining collar, a radially outward fulcrum end retained within the clutch cover, and a medial bearing portion configured for pressing the pressure plate assembly, wherein energy stored by the diaphragm spring is multiplied by the plurality of intermediary levers as the energy is transmitted as pressing force through the bearing portion.

Further, a counterforcing spring is disposed between the pressure plate and the flange portion of the retaining collar, the counterforcing spring configured to bias in a direction axially opposite to biasing of the diaphragm spring.

In the clutch pressing assembly according to the present invention, pressing force of the diaphragm spring is transmitted to the pressure plate through the retaining collar, the lever mechanism and the counterforcing spring intervening during engagement of the clutch, and the pressure plate is pressed toward the flywheel. When the friction element of the clutch disc assembly is held by and between the pressure plate and the flywheel, the counterforcing spring is then compressed between the pressure plate and the retaining collar. During the engagement of the clutch, the lever mechanism increases the pressing force of the diaphragm spring to apply a greater magnitude of the pressing force to the pressure plate. Hence, the spring rate of the diaphragm spring can be predetermined to be relatively low.

Upon disengagement of the clutch, the release mechanism moves axially and forces the retaining collar to move away from the pressure plate. At this time, although the diaphragm spring resists, its resistance force is small because the spring rate of the diaphragm spring is generally low. The counterforcing spring, which was compressed during the engagement of the clutch, urges the retaining collar so as to move it away from the flywheel. Thus, load necessary to disengage the clutch is greatly diminished.

Wherein the lever mechanism includes the lever element and as well as a stop element, during engagement of the clutch, effort is applied to the first end of the lever element, the second end works as a fulcrum, and load or the pressure plate is pressed at the intermediate portion. During disengagement of the clutch, the stop element fixed to the retaining collar comes in contact with the lever element between the first end and the intermediate portion and forces the lever element to move so as to be detached from the pressure plate. In this case, the lever element can be moved to be more quickly detached from the pressure plate, compared with a mechanism where the retaining collar forces the first end of the lever element to move. Thus, the pressing force to the pressure plate is quickly released, and disengagement of the clutch is generally easily effected.

Wherein the counterforcing spring is positioned on a surface of the pressure plate opposite to its pressing surface, the pressing force of the diaphragm spring is transmitted from the lever mechanism to the pressure plate with the counterforcing spring intervening between them. The counterforcing spring can be attached in a simplified configuration.

Wherein the counterforcing spring is placed between the retaining collar and the lever element axially, thermal influence from the clutch is reduced because the elastic element is remote from the pressure plate.

These and other objects, features, aspects and advantages of the present invention will become more fully apparent from the following detailed description of the present invention when taken in conjunction with the accompanying drawings, where like reference numerals denote corresponding parts throughout, in which:

DETAILED DESCRIPTION OF THE PREFERRED EMBODIMENTS

Figure 1:
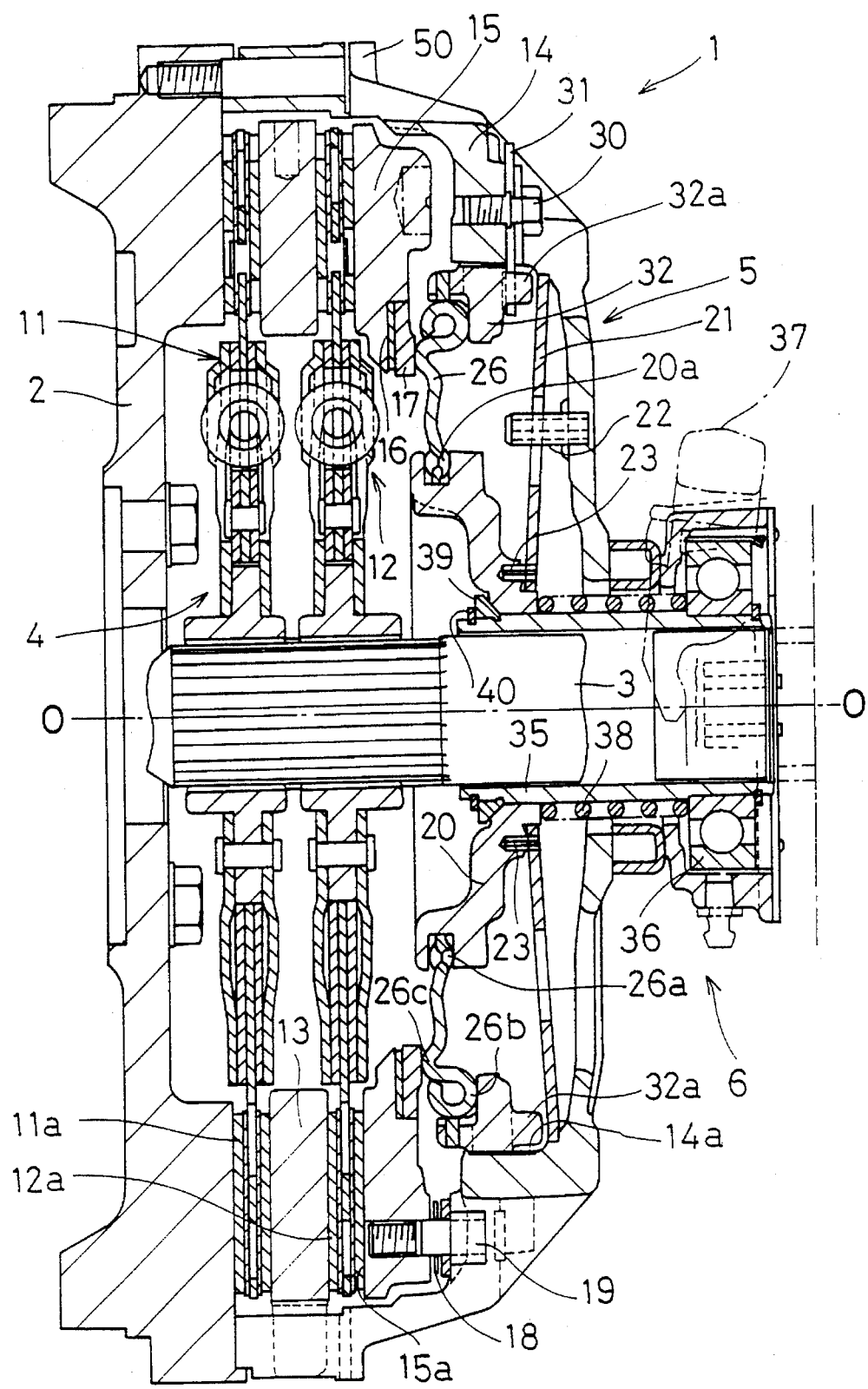
FIG. 1 is a fragmentary, side sectional view showing a pull-type clutch in accordance with one embodiment of the present invention, with the clutch shown mounted on a flywheel with a portion of a clutch release fork shown in phantom.
Figure 2:
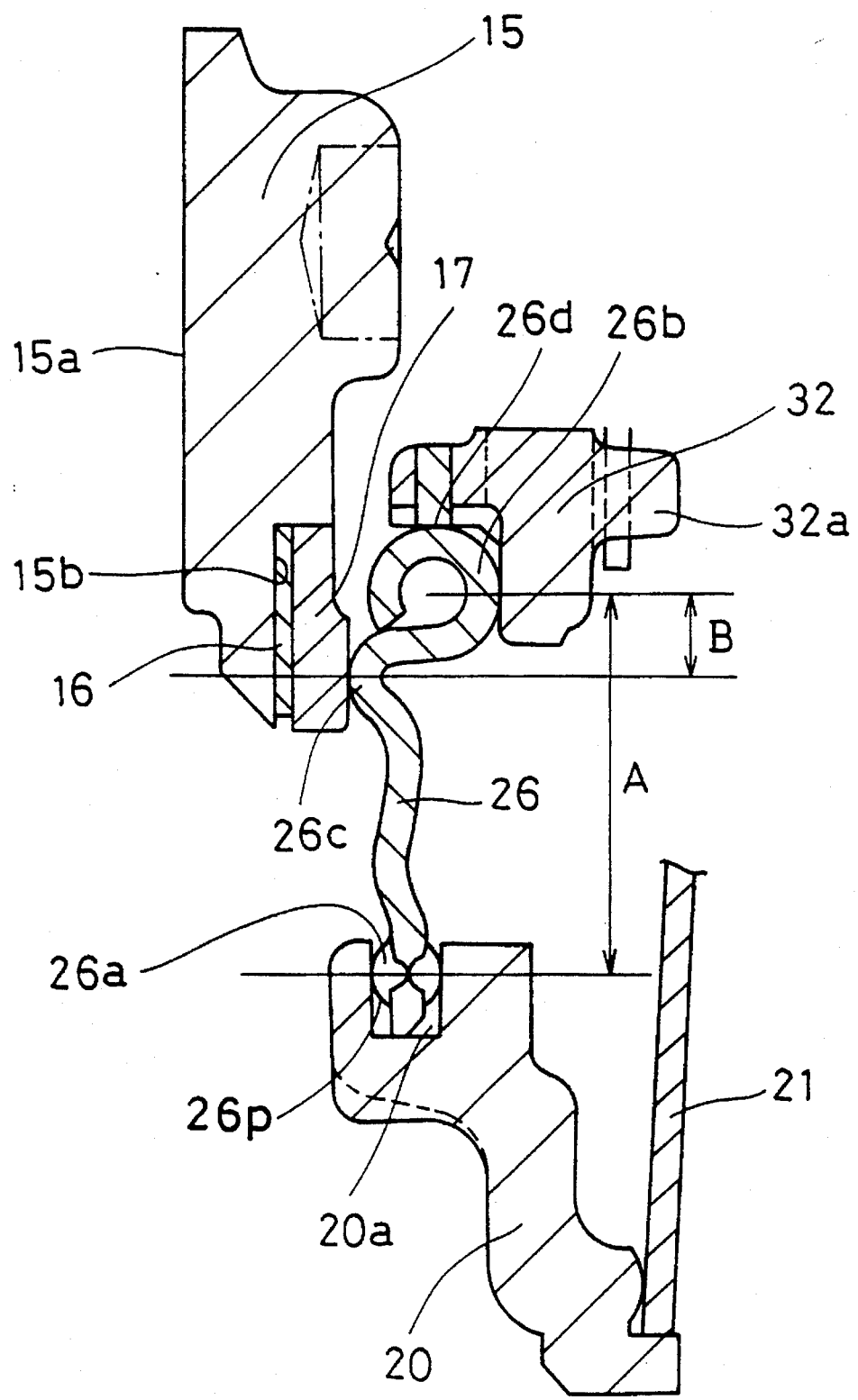
FIG. 2 is an enlargement of a portion of FIG. 1, showing one lever arm of the present invention in functional engagement with a pressure plate.

FIG. 1 depicts a pull-type clutch 1 in accordance with one embodiment of the present invention. The pull-type clutch 1 provides selective transmission of torque between an engine flywheel 2 and a gearbox input shaft 3. The pull-type clutch 1 is a multi-clutch having a dual-clutch disc assembly 4 in combination with a compound pressure plate (described below). With reference to FIG. 1, line O—O denotes the axis of rotation of the pull-type clutch 1. FIGS. 1 and 2 illustrate a state of engagement of the clutch.

The pull-type clutch 1 is primarily composed of a clutch disc assembly 4, a clutch cover assembly 5 and a clutch releasing mechanism 6.

The clutch disc assembly 4 chiefly includes a first clutch disc 11 and a second clutch disc 12. The first clutch disc 11 and the second clutch disc 12 are each provided with corresponding dampers for dampening torsional fluctuations, and each carries on its radially peripheral margin respective friction facings 11a and 12a. Opposite a friction facing of the flywheel 2 is an adjacent friction facing 11a of the first clutch disc 11. An annular intermediate pressure plate 13 is interposed between the other friction facing 11a of the first clutch disc 11 and an adjacent friction facing 12a of the second clutch disc 12.

A plurality of projections is disposed on the circumferential periphery of the intermediate pressure plate 13, and the projections mesh for unitary rotation with corresponding channels in a clutch cover 14 (described below). The friction facings 11a, 12a are attached to opposite surfaces of a planar plate used instead of a conventional cushioning plate. The gearbox input shaft 3 is in splined engagement with corresponding hubs of the first and second clutch discs 11, 12.

The clutch cover assembly 5 includes a clutch cover 14 and contains a diaphragm spring 21 and a retaining collar 20 as principal components actuating a main pressure plate 15. Furthermore, the main pressure plate 15 carries a counterforcing cone spring 16, held via a retaining washer 17.

The clutch cover 14 is bowl-shaped and fixed along its rim to the flywheel 2 by bolts 50. The clutch cover 14 encompasses the clutch disc assembly 4 interposed between it and the flywheel 2. A central opening through which the releasing mechanism 6 surrounding the gearbox input shaft 3 passes is formed in the clutch cover 14.

The main pressure plate 15 is annular, having a pressing surface 15a facing a correspondingly adjacent of the friction facings 12a of the second clutch disc 12. Bolts 19 fix tangentially extending drive straps 18 endwise to the radially peripheral margin of the main pressure plate 15 opposite the pressing surface. The remaining ends of the drive straps 18 are fixed to the clutch cover 14. Accordingly, the drive straps 18 couple the main pressure plate 15 to the clutch cover 14 for limited axial movement exclusive of relative rotational movement.

Along the radially inward margin of the surface of the main pressure plate 15 opposite the pressing surface 15a, an annular channel 15b is formed, as shown in FIG. 2. The cone spring 16 and the retaining washer 17 are disposed in the annular channel 15b, wherein the cone spring 16 urges the retaining washer 17 toward the diaphragm spring 21. As depicted in FIGS. 1 and 2, the cone spring 16 is compressed in a generally flat or planar condition.

Along an axially extending portion of the interior surface of the clutch cover 14 are helical threads 14a, into which an adjuster ring 32 is screwed on mating threads. A plurality of circularly spaced projections 32a extend from the adjuster ring 32 toward the diaphragm spring 21. A lock plate 31 is fixed to the clutch cover 14 by bolts 30. A radially inward margin of the lock plate 31 engages the projections 32a to couple the adjuster ring 32 and the clutch cover 14 as a unit.

The diaphragm spring 21 is discoid, with its radially outward rim being retained by the clutch cover 14. A plurality of pins 23 engage the diaphragm spring 21 with the retaining collar 20 along its radially inward lip, and moreover, pins 22 engage the diaphragm spring 21 with the clutch cover 14, for unitary rotation of the clutch cover assembly 5. The radially inward rim of the diaphragm spring 21 therein impels the retaining collar 20 with a predetermined amount of force, urging the retaining collar 20 toward the flywheel.

Six circularly spaced, radially extending intermediary levers 26 are disposed between the main pressure plate 15 and the retaining collar 20, although only two levers 26 are shown in FIG. 1. The intermediary levers 26 are made, for example, by deforming or molding rectangular metal plates. Each of the intermediary levers 26 has a radially inward lever arm portion 26a, a radially outward fulcrum end 26b, and a medial bearing portion 26c. Each lever arm portion 26a is fitted so as to permit axial pivoting in a circumferential groove 20a in a flange portion of the retaining collar 20. Each fulcrum end 26b rides in a holding portion of the adjuster ring 32 toward the flywheel 2. Each medial bearing portion 26c is formed proximate to the fulcrum end 26b and protrudes toward the flywheel 2, for contacting the retaining washer 17. Each of the intermediary levers 26 also has a tab 26d projecting from the fulcrum end 26b. The tabs 26d meshes with corresponding notches formed in the adjuster ring 32.

The clutch releasing mechanism 6 primarily consists of a sleeve 35, a bearing 36 and a release fork 37. The sleeve 35 encompasses the gearbox input shaft 3, and the end of the sleeve 35 nearer the flywheel 2 carries the hub of the retaining collar 20. A circumferential groove is formed near an end of the sleeve 35 toward the flywheel 2, and a retaining ring 39 is held in the groove by a snap ring 40. The retaining ring 39 contacts a corresponding surface of the retaining collar 20 toward the flywheel 2.

The inner race of the bearing 36 is fixed to the end of the sleeve 35 in the direction toward the gearbox (not shown). A coil spring 38 surrounds the sleeve 35 between the inner race of the bearing 36 and the retaining collar 20. An actuating end of the release fork 37 can operatively engage the outer race of the bearing 36. In vehicular installation, the release fork 37 is coupled to a clutch pedal below the driver's seat. When the driver depresses the clutch pedal, the bearing 36 is moved in the direction toward the (not shown) gearbox by the release fork 37.

Operation of the pull-type clutch pressure plate actuating mechanism will now be described.

During the engagement of the clutch, impelling force of the diaphragm spring 21 causes the retaining collar 20 to be pressed toward the flywheel 2. Each of the arm portions 26a include a curved portion 26p which defines a pivot surface. As illustrated in FIG. 2, the distance from the curved portion 26p (or pivot surface) of the lever arm portion 26a to the fulcrum 26b of the intermediary levers 26 is A, while a distance between the medial bearing portion 26c and the fulcrum 26b is B. The lever ratio of the intermediary levers 26 is expressed as A/B. Thus, the impelling force of the diaphragm spring 21 is multiplied by A/B as the force is transmitted to the main pressure plate 15. As will be recognized, thus increasing the impelling force enables the use of a diaphragm spring having an accordingly reduced spring rate.

When the impelling force is applied through the medial bearing portions 26c of the intermediary levers 26 to the retaining washer 17 and the cone spring 16 in a period of transition from disengagement to engagement of the clutch, the main pressure plate 15 is moved toward the flywheel 2. The first friction facings 11a thus begin to be clamped between the friction surface of the flywheel 2 and the intermediate pressure plate 13, while the second friction facings 12a begin to be clamped between the intermediate pressure plate 13 and the pressing surface 15a of the main pressure plate 15, bringing about a state wherein the clutch is partially but not yet fully engaged.

Then, as the main pressure plate 15 is moved further toward the flywheel 2, the cone spring 16 is elastically deformed axially. Accordingly, elastic deformation of the cone spring 16 prevents abrupt engagement of the clutch and is thus effective in reducing engagement shock. When the cone spring 16 has been completely compressed, a certain amount of impelling force is effected, depending upon predetermined load characteristics of the diaphragm spring 21. Thus, this embodiment herein achieves cushioning properties similar those of conventional devices wherein a cushioning plate is employed.

When the driver depresses the clutch pedal, one end of the release fork 37 forces the bearing 36, the sleeve 35 and the retaining collar 20 to move in the direction toward the gearbox. Although simultaneously there is a resistance load from the diaphragm spring 21 in the direction reverse to that of the movement of the retaining collar 20 (i.e., reverse to the direction of clutch release), the load is small since, as described above, the spring rate of the diaphragm spring 21 is low. Moreover, compressing force on the cone spring 16 is released, such that it impels the retaining washer 17, the intermediary levers 26 and the retaining collar 20 in the direction of the movement of the retaining collar 20 (i.e., in the same direction as that in which the clutch is released), thereby further reducing the release load resistance. In this way, an operator's leg power via a clutch pedal (not shown) needed to actuate the clutch releasing mechanism 6 is greatly reduced.

When the cone spring 16 recovers its original free state, the drive straps 18 force the main pressure plate 15 to move in the direction toward the gearbox, and the friction facings 11a of the first clutch disc 11, together with the friction facings 12a of the second clutch disc 12, are released from compressive hold by the compound pressure plate against the flywheel 2. Thus, the clutch is disengaged and torque transmission is discontinued.

Figure 3:
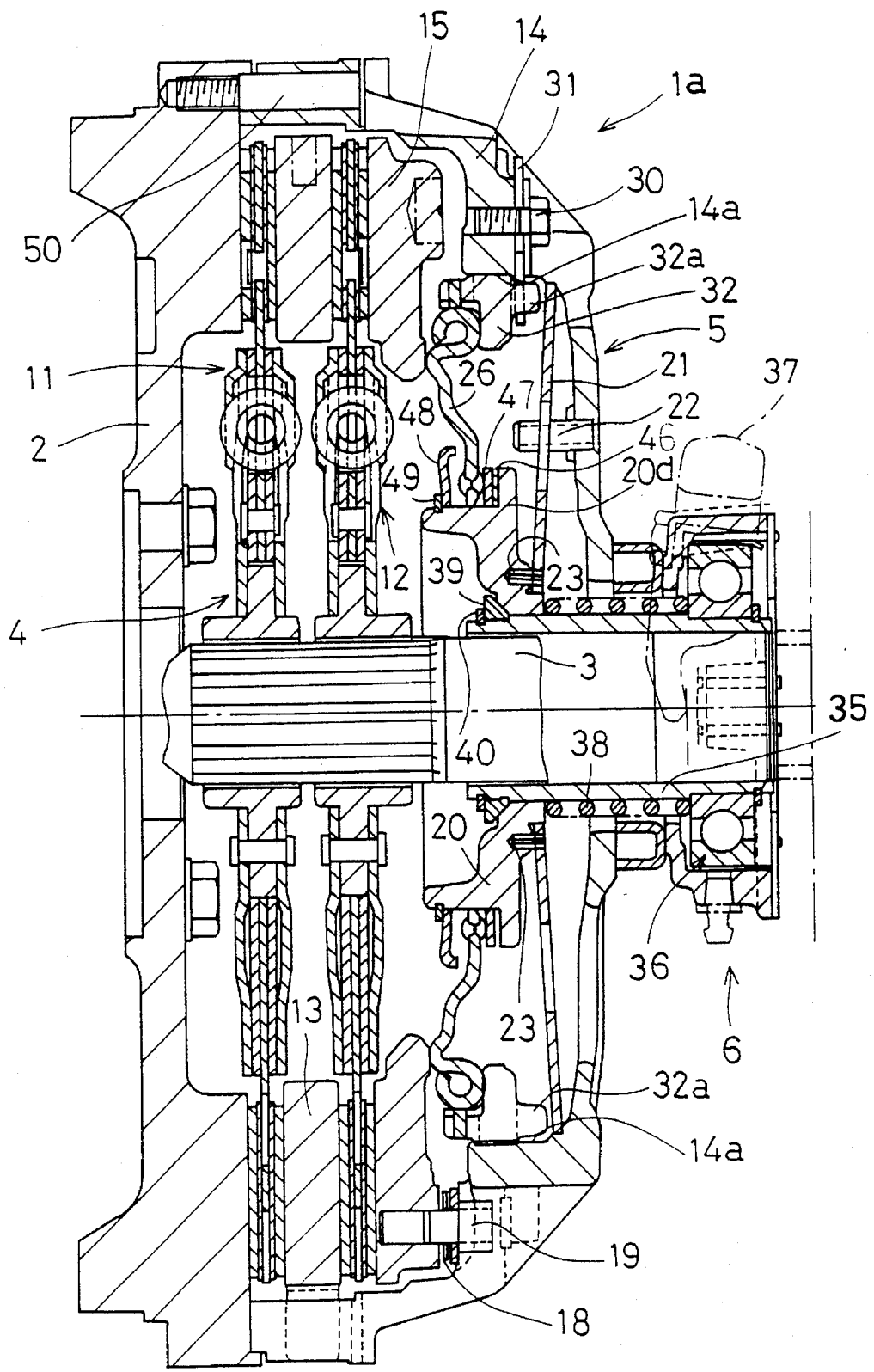
FIG. 3 is a fragmentary, side sectional view similar to FIG. 1 showing a pull-type clutch in accordance with an alternate embodiment of the present invention.

A pull-type clutch 1a in an alternate embodiment of the present invention as illustrated in FIG. 3 is constructed similarly to that shown in FIG. 1. Many of the elements in the clutch 1a in FIG. 3 are generally identical to those described above with reference to FIG. 1, and therefore description of those elements is omitted. Accordingly, only the elements in the clutch 1a depicted in FIGS. 3 and 4 different from elements in the embodiment depicted in FIGS. 1 and 2 and related elements are described below.

Figure 4:
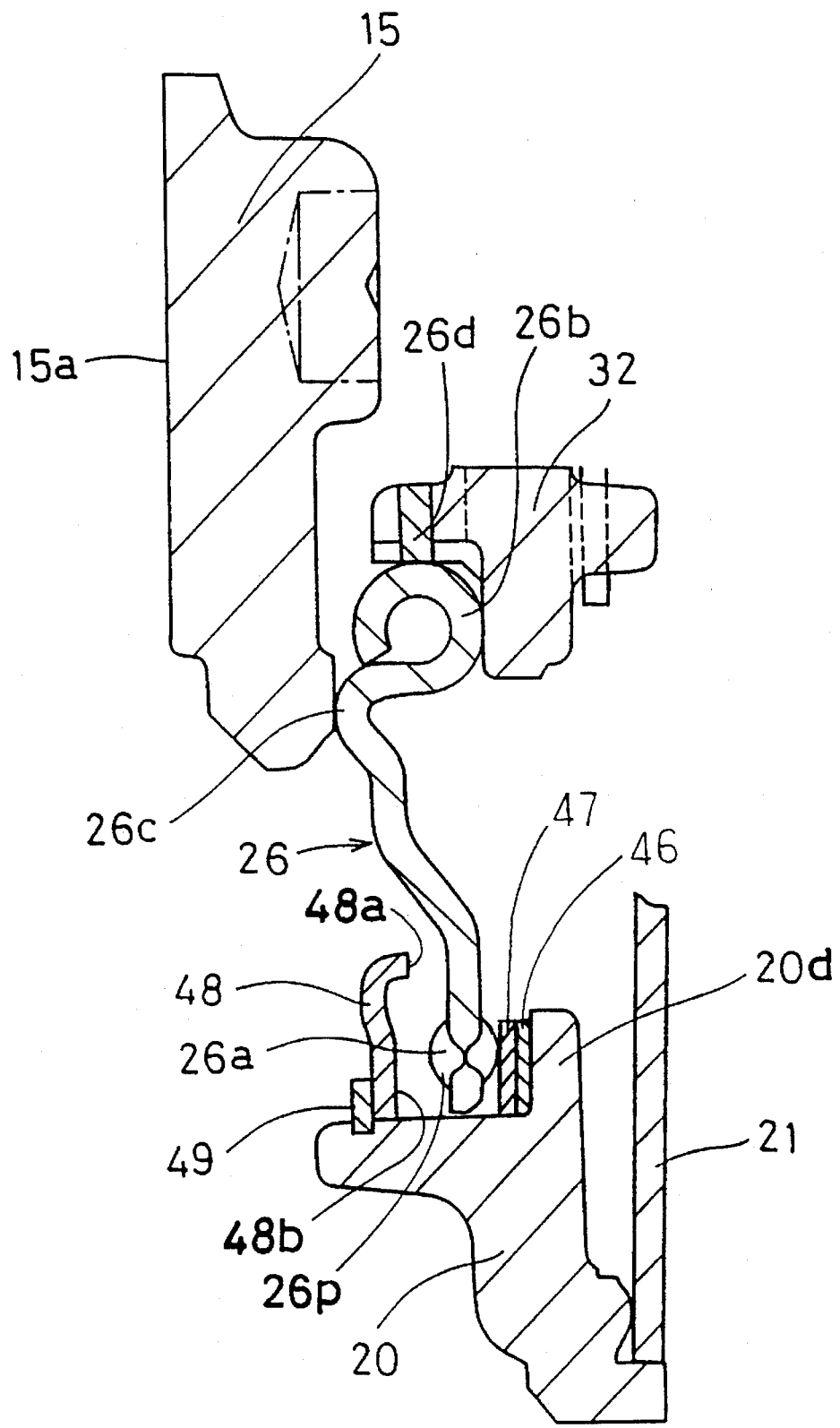
FIG. 4 is an enlargement of a portion of FIG. 3, similar to FIG. 2.

A flange extension 20d is formed protruding from the flange portion of the retaining collar 20 nearer the diaphragm spring 21. A cone spring 46 and a washer 47 are disposed on the radial side of the flange extension 20d nearer to the flywheel 2. The lever arm portion 26a of each of the intermediary levers 26 contacts the adjacent radial surface of the washer 47. The cone spring 46 is compressed between the flange 20d and the lever arm portion 26a toward flatness under the condition as illustrated in FIGS. 3 and 4.

A stop washer 48 is provided along the circumferential periphery of the flange portion of the retaining collar 20 opposing the lever arm portion 26a and nearer the flywheel 2. A snap spring 49 fixed to the retaining collar 20 checks the stop washer 48 against movement toward the flywheel 2. The radially outward rim of the stop washer 48 is bent toward the lever arm portion 26a, forming an abutment 48a.

When the pull-type clutch 1a is in an engaged state (i.e. the clutch is transmitting power), a gap of a predetermined distance is maintained between the abutment 48a of the stop washer 48 and the adjacent portion of the intermediary levers 26. Similarly, in an engaged state, a predetermined gap is maintained between a radially inner surface 48b of the stop washer 48 and the pivot surface 26p of the lever arm portions 26a.

The function of the cone spring 46 during clutch engagement is similar to that as described earlier. However, since the cone spring 46 is placed between the intermediary levers 26 and the retaining collar 20 where it makes no contact with the main pressure plate 15, the cone spring 46 is not subject to thermal influence from the compound pressure plate.

Operation of the accordingly modified pressure plate actuating mechanism during disengagement of the clutch will now be described.

When the driver depresses the clutch pedal (not shown), the actuating end of the release fork 37 of the clutch releasing mechanism 6 forces the bearing 36, and in turn the sleeve 35 and the retaining collar 20, to move in the direction toward the gearbox (not shown). Although simultaneously there is a resistance load from the diaphragm spring 21 in the direction reverse to that of the movement of the retaining collar 20, the load is small since, as described previously, the spring rate of the diaphragm spring 21 is low. Moreover, compressing force on the cone spring 46 is released, such that it impels the retaining collar 20 in the direction of its clutch-releasing movement, thereby further reducing the release load resistance. In this way, an operator's leg power via the clutch pedal (not shown) needed to actuate the clutch releasing mechanism 6 is greatly reduced.

As the retaining collar 20 is moved further, the stop washer 48 abutment 48a subsequently comes into contact with the intermediary levers 26 and the intermediary levers 26 are forced to move in the direction toward the gearbox (not shown). At this time, even though the distance from the position where the stop washer 48 abutments 48a contacts each of the intermediary levers 26 to the fulcrum end 26b is shorter than the distance from the radially inward end of the lever arm portion 26a to the fulcrum end 26b of the intermediary levers 26, mechanical advantage is still gained in drawing the medial bearing portion 26c away from the main pressure plate 15. This effects a higher performance of the disengagement of the clutch.

It is to be noted that a construction incorporating the stop washer 48 and the snap ring 49 of the foregoing modifications of the present invention may be applied to the first embodiment described above and not just to the alternate embodiment.

When the medial bearing portion 26c of the intermediary levers 26 is drawn away from the main pressure plate 15, the drive straps 18 force the main pressure plate 15 to move in the direction toward the gearbox, and the friction facings 11a of the first clutch disc 11, together with the friction facings 12a of the second clutch disc 12, are released from compressive hold by the compound pressure plate against the flywheel 2. Thus, the clutch is disengaged and torque transmission is discontinued.

EFFECTS OF THE INVENTION

In a pressure plate actuating mechanism according to the present invention, since the impelling force of the diaphragm spring is multiplied by a plurality of intermediary levers transmitting the impelling force to press the pressure plate, a diaphragm spring having a lower spring rate can be used, reducing load resistance during clutch disengagement. Moreover, a counterforcing spring applies urging force in the clutch-releasing direction, further reducing release load resistance. As a result, leg power needed to actuate the clutch pedal is reduced.

When pressure-plate impelling force is applied to the lever arm end of the intermediary levers, the medial bearing portion presses the pressure plate, wherein the opposite end of the intermediary levers works as a fulcrum.

Wherein a stop washer is employed in conjunction with the intermediary levers, during clutch disengagement, the stop washer, fixed to the retaining collar, abuts a position radially outward along the lever arms of the intermediary levers to gain mechanical advantage in forcing the intermediary levers to be drawn away from the pressure plate. Thus, impelling force on the pressure plate is readily released, improving releasing performance in disengaging the clutch.

Wherein the pressure plate actuating mechanism further includes a counterforcing spring disposed on a radially extending surface of the pressure plate opposite its clutch-disc contact surface and held in place by a retaining washer, the impelling force of the diaphragm spring is transmitted from the intermediary levers to the pressure plate via the intervening retaining washer and counterforcing spring. Herein, the counterforcing spring is installed in a simplified configuration.

Wherein the counterforcing spring is disposed axially between the retaining collar and the intermediary levers, it is thus situated remote from the pressure plate, reducing susceptibility to thermal influence from the compound pressure plate/dual clutch disc assembly.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A clutch cover assembly in a pull-type clutch mechanism comprising:
    a clutch cover fixed to a flywheel for rotation therewith;
    at least one pressure plate disposed between said clutch cover and said flywheel;
    a release mechanism having a retaining collar and at least partially disposed on said clutch cover;
    a first spring supported on said clutch cover biasing said retaining collar toward said pressure plate and said flywheel;
    a second spring disposed between said pressure plate and said retaining collar; and
    a plurality of lever mechanisms between said pressure plate and said retaining collar, said lever mechanisms configured for movement in response to axial movement of said retaining collar, said second spring configured for compression in response to movement of said plurality of lever mechanisms such that biasing of said second spring opposes biasing of said first spring, said lever mechanisms providing mechanical advantage in engagement and disengagement of the clutch assembly in accordance with a predetermined lever ratio.

2. A clutch cover assembly as in claim 1, wherein each of said lever mechanisms include
    a lever element having a first end in contact with a radial end surface of said retaining collar, a second end supported by said clutch cover, and an intermediate portion extending toward the pressure plate.

3. A clutch cover assembly as in claim 2, wherein said second spring is disposed on a surface of said pressure plate opposite a friction surface of said pressure plate.

4. A clutch cover assembly as in claim 2, wherein said second spring is disposed between a portion of said retaining collar and said lever elements.

5. A clutch cover assembly as in claim 1, wherein said second spring is a conical spring.

6. A clutch cover assembly for a pull-type clutch mechanism, comprising:
   a clutch cover configured for mounting on a flywheel, said clutch cover having a diaphragm spring;
   a pressure plate assembly peripherally supported within said clutch cover;
   a retaining collar disposed concentrically within said clutch cover between said pressure plate and said diaphragm spring and having a radially inward lip supporting a radially inward rim of said diaphragm spring;
   a plurality of intermediary levers, each having
      a radially inward lever end circumferentially retained by a flange portion of said retaining collar,
      a radially outward fulcrum end retained within the clutch cover, and
      a medial bearing portion configured for pressing said pressure plate assembly, wherein energy stored by said diaphragm spring is multiplied by said plurality of intermediary levers as the energy is transmitted as pressing force through said bearing portion; and
   a counterforcing spring disposed between said pressure plate and the flange portion of said retaining collar, said counterforcing spring configured to bias in a direction axially opposite to biasing of said diaphragm spring.

7. A clutch cover assembly as in claim 6, wherein said counterforcing spring is disposed on a surface of said pressure plate opposite a friction surface of said pressure plate.

8. A clutch cover assembly as in claim 6, wherein said counterforcing spring is disposed between a portion of said retaining collar and said intermediary levers.

9. A clutch cover assembly as in claim 6, wherein said counterforcing spring is a conical spring.

* * * * *